United States Patent [19]

Mencacci et al.

[11] 3,806,616

[45] Apr. 23, 1974

[54] SKINNING OF FISH

[75] Inventors: Samuel A. Mencacci, Saratoga; Jurgen H. Strasser, Sunnyvale, both of Calif.; Luis Burgos Toran, Valencia, Spain

[73] Assignee: International Machinery Corporation, S. A., St. Nicklaas-Waas, Belgium

[22] Filed: Mar. 19, 1971

[21] Appl. No.: 126,095

[52] U.S. Cl.................. 426/376, 426/479, 17/50
[51] Int. Cl...................... A22c 25/02, A22c 25/17
[58] Field of Search........................... 99/111, 160

[56] References Cited
UNITED STATES PATENTS

| | | | |
|---|---|---|---|
| 3,453,684 | 7/1969 | Heck | 99/111 |
| 3,594,191 | 7/1971 | Lapeyre | 99/111 |
| 3,593,370 | 7/1971 | Lapeyve | 99/111 |

OTHER PUBLICATIONS

"How to Skin a Catfish," "The Catfish Farmer," Jan. 1971 pp. 11 and 13 Vol. 3, No. 1, Catfish Farmers of America.

Ammerman et al., "Chemical Skinning of Mississippi Catfish," July 1970 Agricultural and Forestry Experiment Station, Mississippi State University.

*Primary Examiner*—Raymond N. Jones
*Attorney, Agent, or Firm*—G. M. Polumbus; C. E. Tripp

[57] ABSTRACT

A process of skinning fish with a caustic solution includes the steps of applying the caustic solution to the skin of the fish to saponify the fat therein and cause at least a partial dissolving of the skin and then brushing or washing the loosened undissolved skin from the fish. Variations to the basic process, which are needed when processing certain types of fish, include (1) pricking the skin to allow the caustic to penetrate the scales in the skin and (2) precooking the fish to firm the underlying meat prior to caustic application.

3 Claims, 9 Drawing Figures

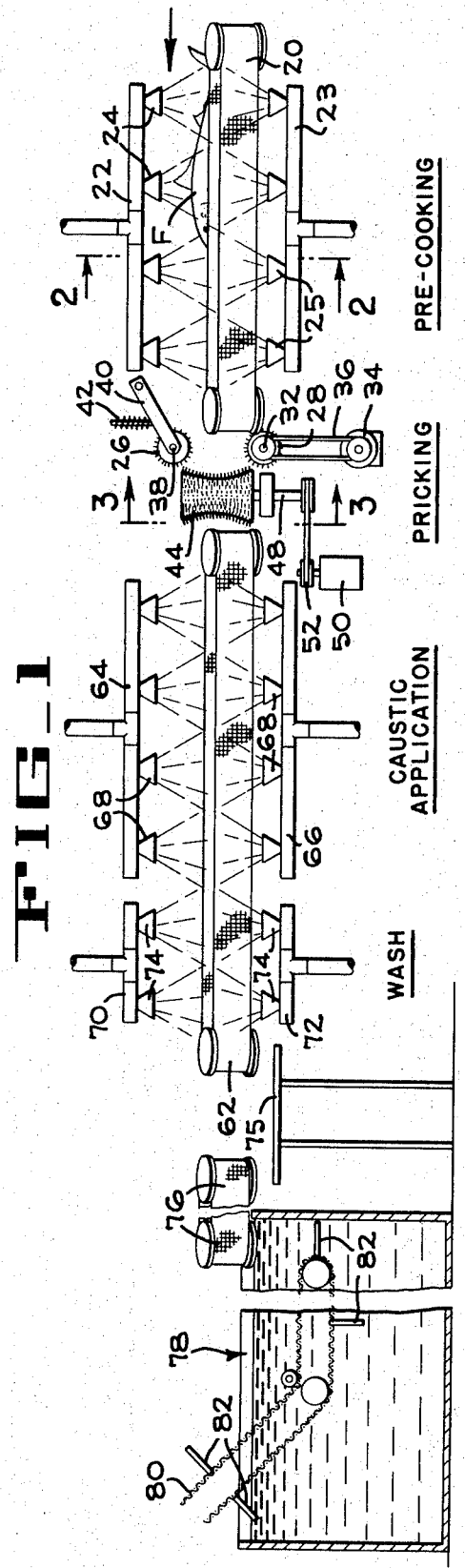
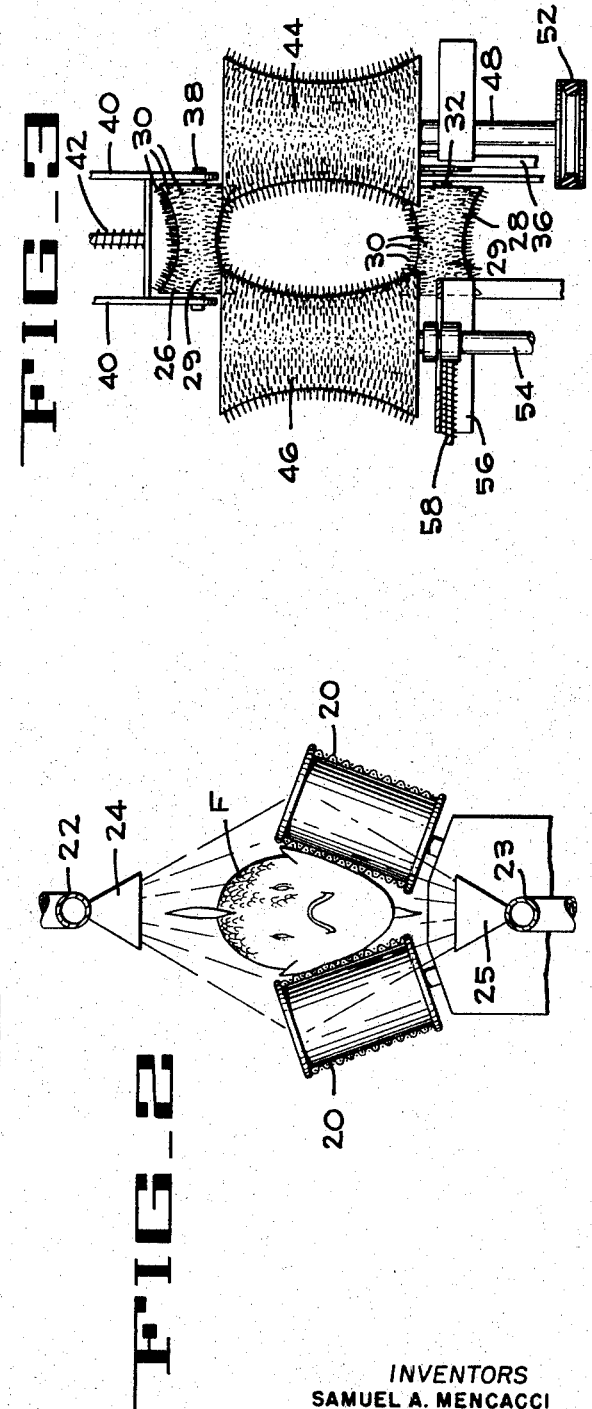

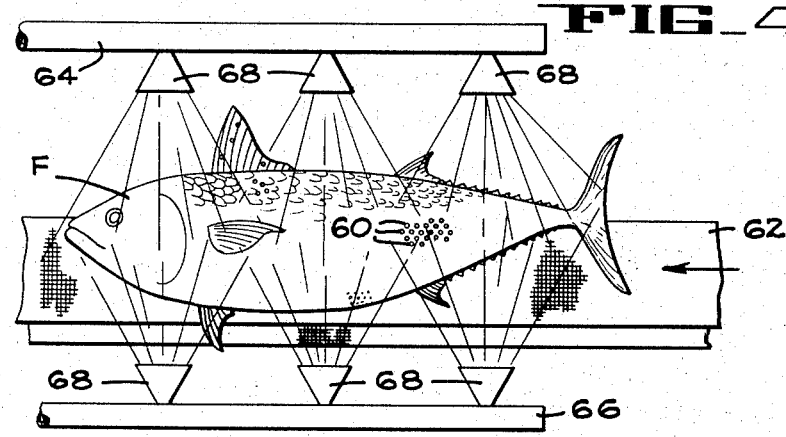
FIG_4A
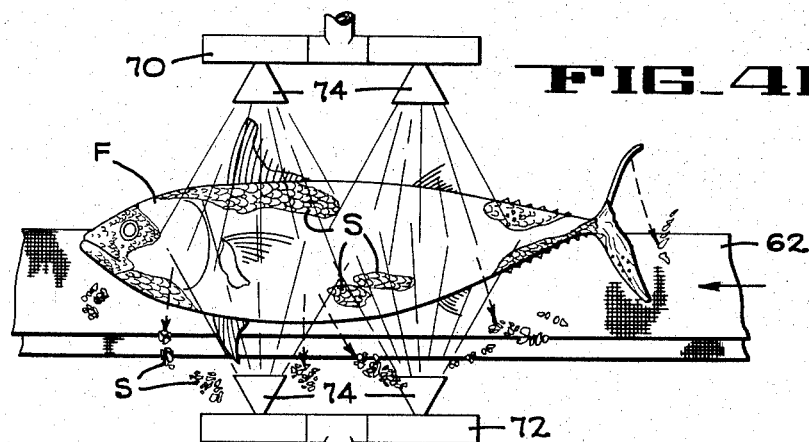
FIG_4B
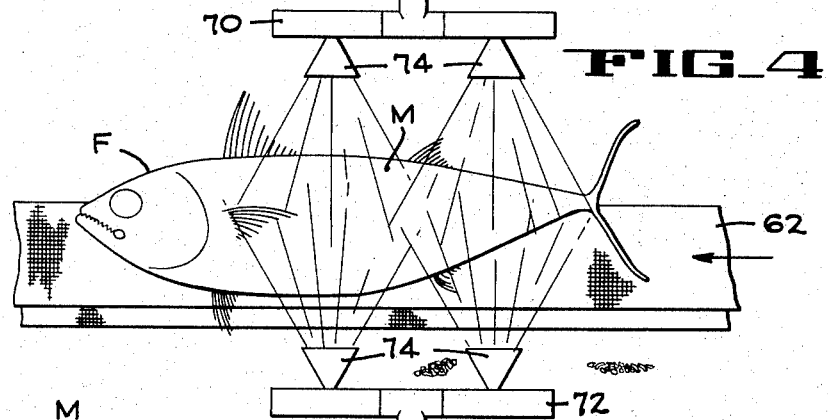
FIG_4C
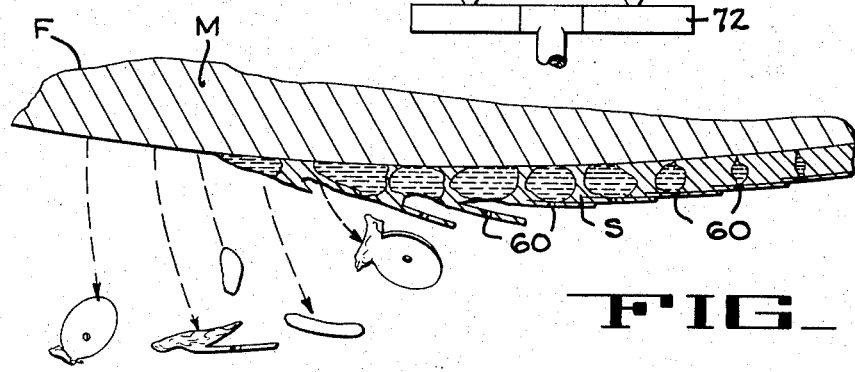
FIG_5

SKINNING OF FISH

BACKGROUND OF THE INVENTION

1. Field of the Invention

The present invention generally relates to the processing of fish and more particularly to the skinning of fish with scales, such as tuna.

2. Description of the Prior Art

Presently, the processing of tuna fish entails taking fresh tuna from fishing vessels to a tuna plant where the fish are beheaded, eviscerated and then placed in wire baskets for pre-cooking. In some instances the fish are frozen on the fishing vessels and must be partially thawed before pre-cooking. In the case of larger tuna which are frozen on the vessel, the fish are normally directed to a band saw where they are halved or quartered depending upon their size.

The pre-cooking operation generally takes place in steam ovens and lasts for a period of time between two and eight hours depending upon the size of the fish. After pre-cooking the fish are allowed to cool for up to twenty-four hours at which time they are taken from the baskets and placed on trimming tables where workers remove the skin, bones, and blood spots.

From both a time and a labor standpoint, the skin removal step is a major one in the overall fish processing operation. The workers must strip the skin with their hands using a suitable knife utensil as an assist, which procedure makes the skinning operation both tedious and time consuming. In fact, when fish are skinned in this manner, forty workers are required to skin enough tuna to keep one conventional tuna canning machine continuously supplied with tuna. Accordingly, a more expedient and labor saving means for skinning tuna, as well as other species of fish useful for commercial processing, is desirable.

SUMMARY OF THE INVENTION

The present invention concerns a new concept in the commercial skinning of fish. Specifically, it concerns a process for the removal of fish skin with a caustic solution, and the process is adaptable for fish with scales. It has been found that fish with scales must be treated differently than fish without scales inasmuch as the caustic solution will not readily affect the scales themselves to any significant degree but will only decompose and at least partially dissolve the skin in which the scales are embedded to make the skin as well as the scales easily removable. For purposes of illustrating the process of the present invention with regard to fish with scales, the processing of tuna fish will be described.

Tuna fish which have been brought to a tuna plant from the fishing vessels are first pre-cooked with hot water or steam to prepare the fish for the caustic treatment. The pre-cooking step softens the connective tissue in the skin to make the tissue more receptive to the caustic solution and also firms the underlying meat or muscle to prevent the caustic from having a detrimental effect thereon. With regard to the present disclosure, the skin of a fish is defined as including the epidermis, dermis, and underlying subcutis.

After pre-cooking, the fish are exposed to a caustic solution which saponifies the fats in the skin and causes at least a partial dissolving of the skin. Any skin which is not decomposed is loosened from the meat by the particularly effective action of the caustic solution on the fats and on the collagen in the dermis and subcutis.

Once the skin has been decomposed by the caustic solution the fish are subjected to skin removal means which removes the remaining skin from the meat along with substantially all of the caustic solution that remains on the fish after the caustic treatment.

The tuna are then beheaded, eviscerated, and directed into a cooker which will remove any remaining residue of caustic solution. Cooking the fish makes the meat suitable for subsequent handling and for easier bone and blood spot removal.

With regard to the present disclosure, it will be understood that the term "caustic solution" defines a solution of a strong alkali material, such as sodium hydroxide or potassium hydroxide, in sufficient strength to attack and decompose animal matter.

Accordingly, it is an object of the present invention to provide a new method of skinning fish.

It is another object of the present invention to provide a method of skinning fish which utilizes a caustic solution to decompose the fish skin by saponifying the fats therein and causing at least a partial dissolving of the skin.

BRIEF DESCRIPTION OF THE DRAWINGS

FIG. 1 is a diagrammatic side elevation, partially sectioned and broken away for clarity, showing one embodiment of an apparatus for carrying out the process of the present invention.

FIG. 2 is an enlarged vertical section taken along line 2—2 of FIG. 1.

FIG. 3 is an enlarged vertical section taken along line 3—3 of FIG. 1.

FIGS. 4A, 4B and 4C are enlarged fragmentary diagrammatic views illustrating the successive operations upon a fish as it progresses through the apparatus of FIG. 1.

FIG. 5 is a further enlarged fragmentary diagrammatic section of the surface of a fish during treatment by the process of the present invention.

DESCRIPTION OF THE PREFERRED EMBODIMENT

Referring to FIG. 1, a diagrammatic representation of one embodiment of an apparatus for carrying out the method of the present invention is shown. It will be seen that a fish F having scales, such as a tuna, which is treated in accordance with the subject process encounters six separate operations; specifically, 1) pre-cooking, 2) pricking, 3) caustic application, 4) wash, 5) evisceration, and 6) cooking. It is to be understood that the temperature and exposure time ranges for the above operations, as set forth hereinafter with regard to the processing of tuna fish, have been determined on the basis of the treatment of tuna which were not completely frozen but which had been partially thawed to approximate the condition at which such fish normally arrive at a commercial processing plant.

During the pre-cooking operation (FIGS. 1 and 2), the tuna fish F are confined between a pair of opposed endless screen conveyors 20 which are driven (by means not shown) to advance the fish in the direction of the arrow (FIG. 1). The screen conveyors 20 can be seen in FIG. 2 to define a trough open at both the top and bottom which will support fish of varying sizes within a predetermined range. Mounted above and below the conveyors 20 are water headers 22 and 23, respectively, having spray nozzles 24 and 25, respectively, evenly distributed along their length. The headers 22 and 23 are connected to pressurized water supplies which are not shown. The water supplied to the headers 22 and 23 is preheated to have a temperature in the range of 90°–100°C., and, with the water in this temperature range, the conveyors 20 are driven at a speed such that the fish are held in the pre-cooking portion of the apparatus for 5 to 15 minutes depending on the thickness of the skin of the fish. It is contemplated that 100°C. steam could also be used to pre-cook the tuna fish rather than the heated water.

Fish leaving the pre-cooking operation are passed first between upper and lower prickers 26 and 28, respectively. The prickers 26 and 28 are rotatable members each having an annular fish engaging surface 29 (FIG. 3) which is concave in longitudinal cross-section. Each pricker is provided with a plurality of randomly oriented needles 30 which extend normally away from the surface 29 in a position to prick the skin of the fish as it passes adjacent to the prickers. The needles are long enough to extend deep into the skin. The lower pricker 28 is rotatably mounted in a fixed position on a horizontal drive shaft 32 and is driven in a counter-clockwise direction (as viewed in FIG. 1) by a motor 34 through a belt-pulley drive mechanism 36. The pricker 28 is disposed to support the underside of a fish F as the fish leaves the screen conveyors 20 of the pre-cooker and to advance the fish through a portion of the pricking operation. The upper pricker 26 is an idler picker and is fixed on a horizontal shaft 38 that is rotatably mounted upon a pivotally supported bracket 40 above the path of travel of the fish. The bracket 40 is biased downwardly by a compression spring 42 whereby the pricker 26 is urged into pricking engagement with the upper surface of the fish.

Downstream from and immediately adjacent to the upper and lower prickers 26 and 28 are side prickers 44 and 46. Prickers 44 and 46 are similar in shape and construction to the prickers 26 and 28 but are of an enlarged size to conform to the large side surfaces of a fish. It will be apparent from FIG. 3 that the concave fish engaging surfaces of the four prickers define an enclosed pocket in which the fish is retained while passing through the pricking operation. Pricker 44 is rotatably mounted in a fixed position on a vertical drive shaft 48 and is driven by a motor 50 through a belt-pulley drive mechanism 52. The pricker 44 will be rotated in a direction whereby it will continue to advanve a fish through the pricking operation after the fish loses contact with the lower pricker 28. The other side pricker 46 is an idler pricker and is fixed on a rotatable vertical shaft 54 that is mounted for horizontal reciprocable movement along a slotted bracket 56. The shaft 54 is biased toward the path of travel of the fish by a compression spring 58.

It will be apparent that both idler pricker 46 and idler pricker 26 will be caused to rotate by pricking engagement with the fish and will, therefore, distribute, along with the driven prickers 28 and 44, a plurality of perforations 60 (FIG. 4A) in the skin of the fish as the fish are advanced through the pricking operation. The pricking of the fish enables a more efficient and effective skin removal in the case of tuna fish as will be explained in more detail hereinafter.

Upon leaving the pricking operation, the fish are passed between screen conveyors 62 which are substantially identical to screen conveyors 20 and define a trough in which the fish are confined as they are advanced through both the caustic application and the wash operations.

Immediately upon being passed to the conveyors 62 a caustic solution is sprayed onto the fish. A caustic solution which has been found suitable for saponifying the fats and decomposing the collagan in the skin of a tuna is a sodium hydroxide solution with about a 5–10 percent concentration by weight. The caustic solution is sprayed on the fish through an upper header 64 and a lower header 66 each having a plurality of spray nozzles 68 distributed along the length thereof whereby the solution will be distributed about the entire outer surface of the fish.

For best results, the caustic solution should be heated to a temperature in the range between about 90°C. and about 100°C., and it should be sprayed on each individual fish for a period of time between about 5 and about 15 minutes. The speed of the conveyors 62 is adjusted so that the desired caustic exposure time is achieved. The required exposure time to the spray as well as the temperature of the solution is dependent upon the thickness of the skin of the fish; however, for a typical tuna fish of the albacore variety the aforementioned ranges were found to be the most efficient. In some instances, where the fish being processed have an abundance of scales, it is desirable to introduce a wetting agent, such as Tergitol, into the caustic solution to reduce its surface tension whereby the caustic can more easily pass beneath the scales to penetrate the epidermis and attack the lower layers of the skin.

While still being transported by the conveyors 62, the fish are passed into the wash operation where hot water is used to wash the remaining decomposed skin as well as the excess caustic solution from the underlying meat of the fish. Upper and lower water headers 70 and 72, respectively, are positioned about the conveyor and are each provided with jet spray nozzles 74 distributed along their length for spraying high velocity hot water on the fish. The water preferably has a temperature in the range of from about 90°C. to about 100°C., and it is sprayed on each fish for a period of time of from about 1 to 5 minutes after which time the skin will have been completely washed from the remainder of the fish and collected in a suitable receptacle (not shown).

After washing, the fish are deposited on an eviscerating table 75 where a minimal number of workers are used to eviscerate each fish. The fish are then placed by the workers between a pair of transfer conveyors 76, which may be similar to the screen conveyors 20 and 62, so that the fish will be conveyed to a cooking bath 78.

The cooking operation is shown as being performed in a bath, which is normally hot water; however, steam could also be used if desired. The bath 78 is maintained between about 90° and 100°C., and a slow moving endless conveyor 80 having spaced flights 82 is provided for advancing the fish through the bath. The conveyor 80 is driven at a speed whereby the fish remain in the bath anywhere from about 1 hour to about 6 hours depending upon the size of the fish. The purpose of the cooking operation is to toughen the tuna fish meat for conventional de-boning and blood spot removal operations, and such cooking will also remove any remnants of the caustic solution from the body of the fish.

It is contemplated that various alternatives to the above described process may be used in practicing the present invention. Specifically, it is conceivable that the prickers can be completely eliminated by extending the duration of time the fish are exposed to the caustic solution inasmuch as the prickers merely function to provide access passages for the caustic solution so that it can more quickly penetrate the skin and attack the connective tissue and the protein and fat matter thereof. Given a long enough period of time, the caustic will thoroughly penetrate the skin by decomposing the collagen and saponifying the fats without the presence of the perforations 60. Furthermore, brushes or other mechanical means might be used to remove the skin which remains on the treated fish instead of using the hot water jets. Variations of the means for applying the caustic solution are also possible. This step in the operation could be accomplished by cascading a flow of the caustic solution over the fish or by submerging the fish for the desired time in a caustic bath.

To summarize the process of the present invention as applied to the processing of a fish with scales and a relatively soft meat, such as tuna fish, the fish are placed on the conveyors 20, either manually or otherwise, and exposed to the hot water sprays for a period of time of from about 5 minutes to about 15 minutes. The hot water pre-cooks the fish so that the fat and the connective tissue in the skin is softened and the underlying meat toughened. As the fish leaves the pre-cook operation it is passed through the prickers 26, 28, 44 and 46 which perforate the skin, including the scales, to provide passages whereby the caustic solution can readily penetrate the skin. The fish is next transferred from the prickers to the conveyors 62 upon which the fish rests as the 5–10 percent caustic solution is applied thereto. When the fish has been pricked the caustic solution need only be applied for a period of time of from about 5 to about 15 minutes during which time it will have penetrated the skin and saponified enough of the fats therein to cause a general decomposition of the skin. The fish while still on the conveyors 62 then passes under the hot water jet sprays 74 which wash the skin from the remainder of the fish. In addition, substantially all of the caustic solution which was applied to the fish will also be washed away at this time.

The transformation of the fish as it passes along conveyors 62 is illustrated in FIGS. 4A through 4C. In FIG. 4A the fish is seen immediately after it has left the prickers and it has been provided with perforations 60 distributed uniformly across its body, head, and fins. The caustic solution is then sprayed on the fish. In FIG. 4B the fish has begun to pass under the wash spray nozzles 74, and the remaining skin is physically removed from the fish. In FIG. 4C the fish is seen leaving the hot water jet sprays with its skin entirely removed. In the condition shown in FIG. 4C, the fish is ready for evisceration.

In FIG. 5, a fragment of the fish has been greatly enlarged to illustrate the effect of the skinning process of the present invention. It can be seen at the far right side of the figure that the perforations 60 penetrate a substantial portion of the skin S providing ready access passages to the dermis and subcutis for the caustic solution. In the center of the figure, the condition is illustrated wherein the caustic is attacking the collagen and saponifying the fat and causing a dissolution thereof so that the skin is decomposed and loosened from the meat M. At the far left side of the figure, the decomposed skin is seen being washed away.

In order to illustrate more fully the nature of the present invention, the following specific examples of typical processing operations are set forth, it being understood that these examples are presented for illustrative purposes only.

EXAMPLE I

A section of tuna fish was skinned successfully by first steam pre-cooking the fish in a pressure cooker at 100°C. for 10 minutes. The skin of the fish was then perforated with a fork to allow the caustic to more quickly penetrate the skin. A 5 percent concentration solution of NaOH at a temperature of 95°C. was then brushed on the skin of the fish for a 5 minute period. At the end of that time, the decomposed skin was washed away from the meat of the fish with 95°C. water. The water was sprayed across the fish for a 1 minute period after which it was noted that all of the skin of the fish had been thoroughly removed with no noticeable damage to the meat.

EXAMPLE II

A section of tuna fish was skinned successfully by first steam pre-cooking the fish in a pressure cooker at 100°C. for 10 minutes. The skin of the fish was then perforated with a fork to allow the caustic to more quickly penetrate the skin. A 10 percent concentration solution of NaOH at a temperature of 95°C. was then brushed on the skin of the fish for a 2 minute period. At the end of that time, the decomposed skin was washed away from the meat of the fish with 95°C. water. The water was sprayed across the fish for a 1 minute period after which it was noted that all of the skin of the fish had been thoroughly removed with no noticeable damage to the meat.

Although the best modes contemplated for carrying out the present invention have been herein shown and described, it will be apparent that modification and variation may be made without departing from what is regarded to be the subject matter of the invention.

What is claimed is:

1. A process for removing the skin and scales of tuna fish comprising the steps of pre-cooking the fish to firm the meat underlying the skin to prevent a caustic solution from having a detrimental effect thereon, wetting the skin and scales of the fish with a caustic solution and keeping the fish in contact with the caustic solution for a period of time sufficient to loosen the scales by saponification of the fats in the skin which connect the skin to the underlying meat thereby reducing the adhesive attachment of the skin and scales to the meat and causing at least a partial dissolution of the skin, spraying a liquid onto the fish to wash the saponified fat and remaining skin and scales from said underlying meat of the fish along with the caustic solution at the end of said period of time, and forming perforations in the skin and scales of the fish in a plurality of locations prior to the application of caustic solution in order to facilitate the introduction of the caustic solution to the skin which underlies the outer scales for aiding in the release of the scales of the tuna fish.

2. A method of skinning fish with scales comprising the steps of applying a caustic solution to the fish skin, scales and underlying meat; introducing a wetting agent into the caustic solution to reduce the surface tension of the caustic solution allowing the caustic solution to more easily pass beneath the scales; maintaining the caustic solution on the fish for a sufficient period to penetrate into and saponify skin fats which connect the skin to the underlying meat to loosen the scales by causing at least a portion of the skin to dissolve and weaken the bond between the scales, the undissolved skin and the meat; applying a skin and scale removing force to the remaining decomposed skin to remove it from the meat; washing the caustic solution from the meat; and forming access passages through the skin and scales into the fatty area prior to applying the caustic solution to the fish to cooperate with the wetting agent for increasing the rate at which the caustic solution saponifies the fat.

3. A method according to claim 2 wherein the access passages are formed by pricking the scales and skin of the fish.

* * * * *